Aug. 12, 1947.  T. R. ARDEN  2,425,665
IMPLEMENT OR TOOL
Filed June 7, 1945  2 Sheets-Sheet 2
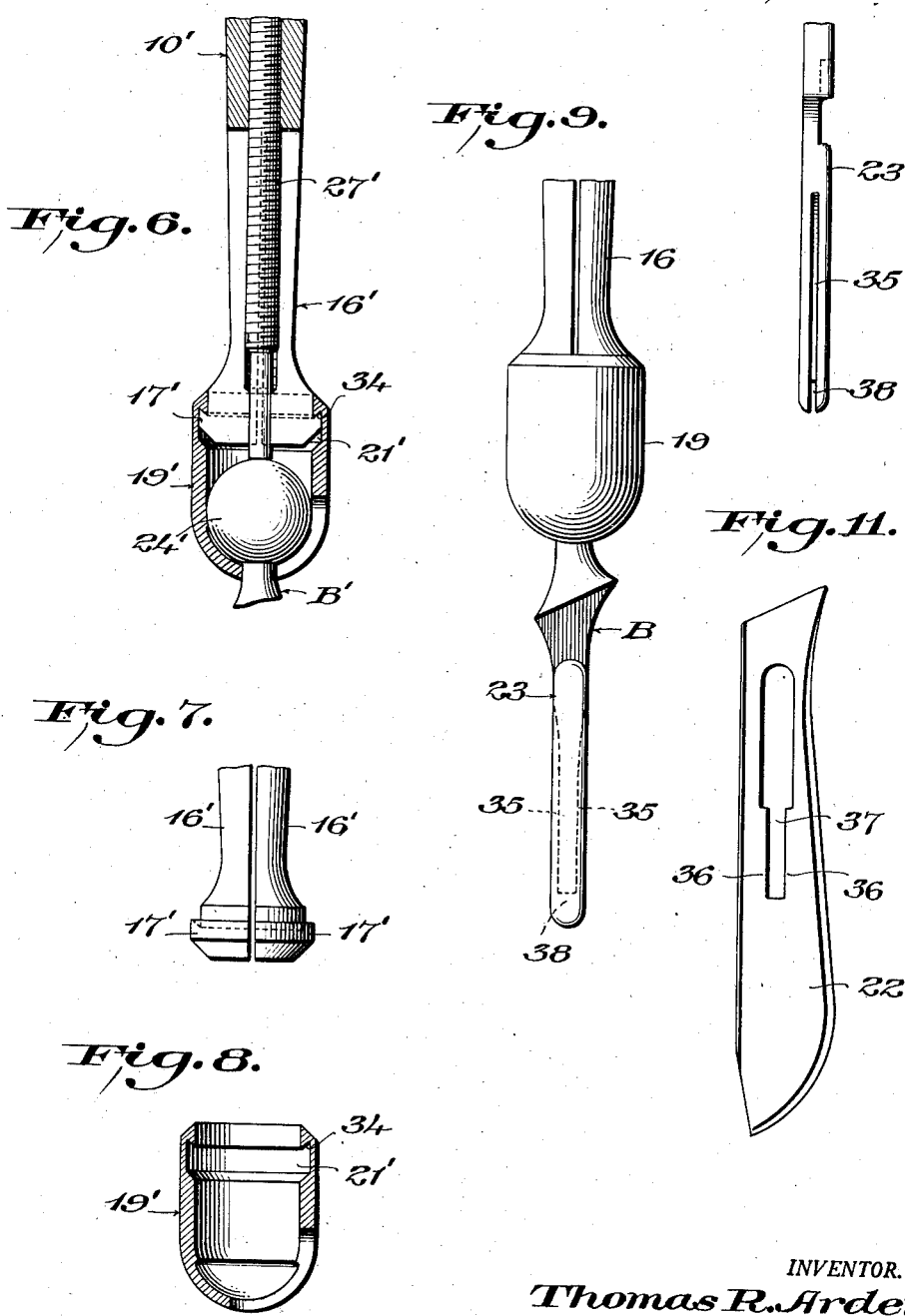
INVENTOR.
Thomas R. Arden,
BY
ATTORNEY Patented Aug. 12, 1947

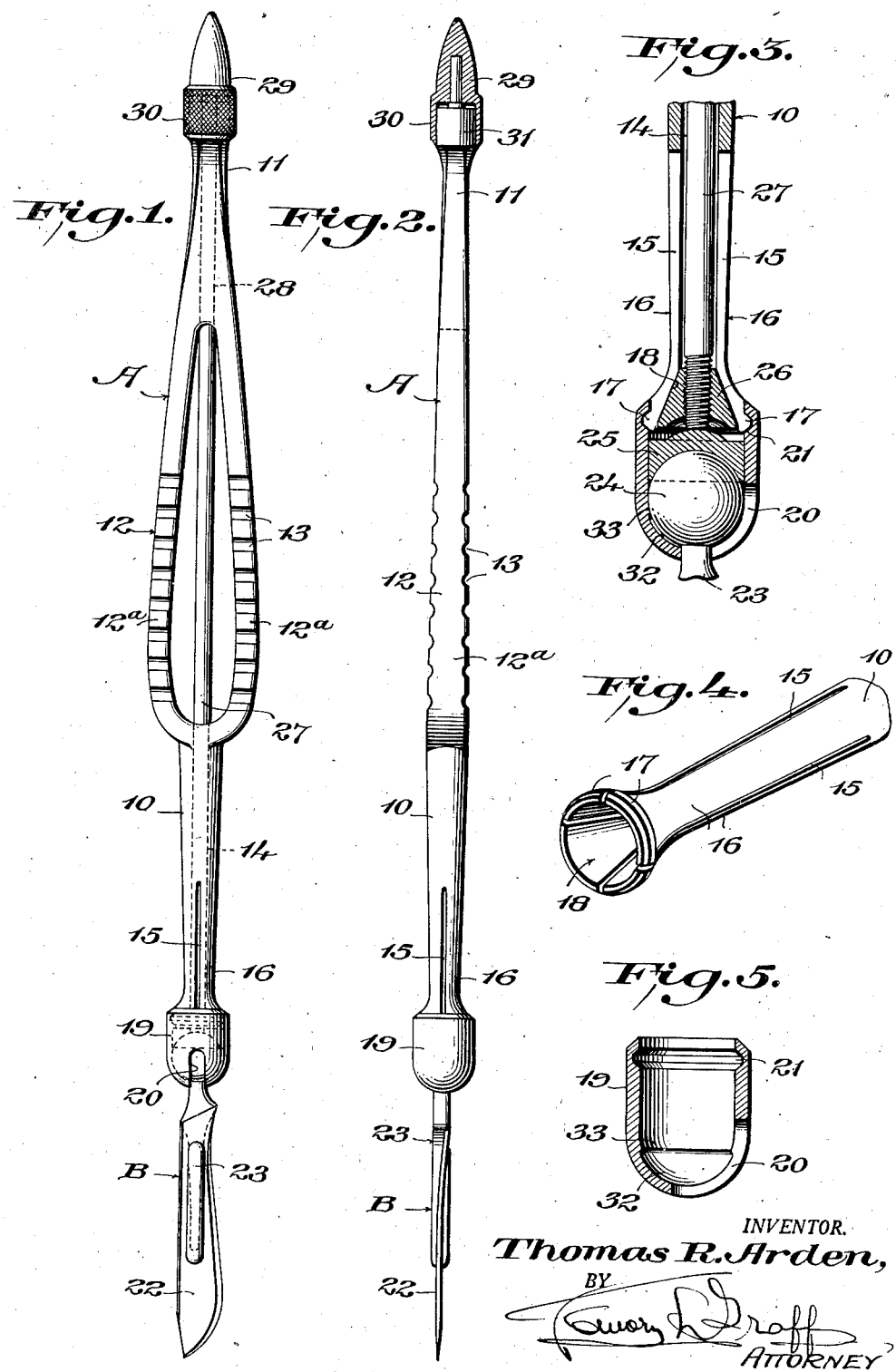

2,425,665

UNITED STATES PATENT OFFICE 2,425,665

IMPLEMENT OR TOOL

Thomas R. Arden, Danbury, Conn., assignor to Bard-Parker Company, Inc., Danbury, Conn., a corporation of New York Application June 7, 1945, Serial No. 598,081

8 Claims. (Cl. 306—7)

1

This invention relates to implements, tools and the like of the type comprising a work-performing or work-engaging element or unit and a handle therefor, and has for its general object to provide an implement, tool or the like of this type having a simple, practical joint or connection between the handle and the work-performing or work-engaging element or unit thereof to enable the latter readily to be adjusted to and to be secured firmly in various different operative positions angularly with respect to the handle.

With the foregoing general object and various other ancillary objects in view, which will become more fully apparent as the nature of the invention is better understood, the same consists in an implement, tool or the like embodying the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 1 is a side elevation of an implement in the form of a surgical scalpel constructed in accordance with one practical embodiment of the invention.

Figure 2 is an edge view of the scalpel shown in Fig. 1.

Figure 3 is an enlarged, fragmentary, longitudinal section through the joint between the handle and the blade unit of the scalpel shown in Figs. 1 and 2.

Figure 4 is an enlarged, fragmentary, perspective view of the inner end portion of the handle.

Figure 5 is an enlarged, longitudinal section through the socket element of the joint between the handle and the blade unit.

Figure 6 is a view similar to Fig. 3 illustrating an alternative form of the joint between the handle and the blade unit.

Figure 7 is a fragmentary side elevation of the inner end portion of the handle of the Fig. 6 construction.

Figure 8 is a view similar to Fig. 5 of the socket element of the Fig. 6 construction.

Figure 9 is a fragmentary side elevation showing particularly the form of the blade-supporting arm of the scalpel.

Figure 10 is an edge view of the blade-supporting arm of the scalpel and

Figure 11 is a side elevation of a blade for detachable connection with the arm shown in Figs. 9 and 10.

While the features comprising the invention

2 may advantageously be embodied in implements, tools and the like of various specifically different types, they are of special utility and advantage when embodied in surgical scalpels. Accordingly, the invention has been illustrated and will be described in connection with a surgical scalpel. This, however, is not to be construed as limiting, but merely as an arbitrary selection for purposes of illustrating one particular adaptation of the invention.

Referring to the drawings in detail, it will be observed that the scalpel illustrated includes, as usual, a handle, designated generally as A, and a blade unit, designated generally as B.

The handle A may be formed from any suitable material and may be of any desired design. Preferably, however, it is of slender, elongated form and comprises an outer end portion in the form of a slender shank 10 of suitable length, a slender inner end portion 11 of suitable length, and an intermediate hand-grip portion 12 connecting said end portions 10 and 11 together.

Preferably the intermediate or hand-grip portion 12 is flattened and is of greatest width adjacent to the shank 10 and tapers toward the inner end portion 11 to adapt the handle to be grasped comfortably and firmly by the hand and to be readily held against rotation about its longitudinal axis relative to the hand. Preferably, too, said intermediate or hand-grip portion is composed of a pair of spaced apart bars 12$^a$ to further adapt the same to be grasped comfortably and firmly by the hand. Moreover, said bars 12$^a$ preferably are transversely grooved, as indicated at 13, or have roughened surfaces to guard against slippage of the handle relative to the hand. Furthermore, the material comprising the handle preferably is distributed so that the complete scalpel is well balanced and is easy to handle. However, the handle may be of any other design if desired.

Referring now particularly to the form of the invention illustrated in Figs. 1 to 5, it will be observed that the shank 10 is axially bored, as indicated at 14, and is slit longitudinally from its outer or free end inwardly any suitable distance at a plurality of angularly spaced points, as indicated at 15, to provide a plurality of radially flexible clutch arms 16. It will further be observed that each clutch arm 16 is provided adjacent to its outer end with an exterior rib 17 of outwardly tapered or wedge shape in cross section and that, collectively, these ribs constitute a substantially continuous annular rib interrupted only by the slits 15. Additionally, it will be observed that the outer end portion of the bore 14 is flared or of conical form, as indicated at 18.

Mounted upon the outer or free end portion of the shank 10 is a hollow socket member 19 which preferably is of circular shape in cross section, at least internally, and which is open at its inner end and of hemispherical, closed form at its outer end, except that it is provided with a slot 20 which is disposed in a plane including the longitudinal axis of said socket member and which extends approximately ninety degrees from said axis.

Adjacent to its open, inner end the socket member 19 is provided with an internal, annular channel 21 which is of outwardly tapering or wedge shape in cross section and which is complemental to the ribs 17 to wedgingly accommodate the latter.

The blade unit B preferably includes, as usual, a blade 22 and an arm 23 upon which said blade is removably, replaceably mounted. In addition, and in accordance with the invention, the arm 23 is provided at its inner end with a spherical or ball head 24.

The spherical or ball head 24 is disposed in the hemispherical outer end portion of the socket member 19 and the arm 23 extends from said head through the slot 20.

Disposed within the socket member 19, inwardly with respect to the spherical or ball head 24 and preferably neatly fitting said socket member, is a head-clamping member 25 which, at its outer end, preferably is provided with a recess of spherical contour accommodating the inner portion of said head 24.

Disposed within and complementing the flared or conical outer end portion 18 of the bore 14 is a conical wedge member 26 which is provided with an axial, threaded bore in which is threaded the outer end portion of a rod 27.

The rod 27 extends through the bore 14 of the shank 10 and through an axial bore 28 in the inner end portion 11 of the handle A and at its inner end has suitably fixed thereto a preferably knurled head or finger grip element 29 for effecting its rotation.

Preferably the head or finger grip element 29 includes a hollow skirt portion 30 neatly engaged over a cylindrical terminal part 31 of the inner end portion 11 of the handle A to provide a neat finish to said inner end portion 11 and to support the rod 27 axially with respect to said handle. However, this construction is not essential and the finger grip element 29 may be of any other form desired. In any event, it is apparent that with the outer end of the rod 27 engaged against the clamping member 25, and with the wedge member 26 disposed in and frictionally held against rotation by the conical portion 18 of the bore 14, rotation of the rod 27 in a direction to thread the same outwardly through said wedge member 26 will result in said wedge member and said clamping member 25 being urged inwardly and outwardly, respectively. In other words, the rod 27 will react from the clamping member 25 to urge the wedge member 26 inwardly, and from said wedge member to urge said clamping member outwardly. As a consequence, the spherical or ball head 24 of the arm 23 will be clamped in the outer end portion of the socket member 19 and the wedge member 26 will act to force the clutch arms 16 outwardly with the result that the ribs 17 will be wedged into the channel 21 of said socket member and thereby will act to fasten the latter securely to the shank 10. Conversely, it will be apparent that upon only slight rotation of the rod 27 in a direction to thread it inwardly through the wedge member 26, the spherical or ball head 24 will be released for rotative adjustment and, at the same time, the clutch arms 16 will be released to permit rotative adjustment of the socket member 19 relative to the shank 10.

When the spherical or ball head 24 and the socket member 19 are released, the arm 23 obviously may be swung through the slot 20 in a plane including the axis of the handle A to any desired angular position relative to said handle between a position in axial alinement therewith and a position at right angles or at substantially right angles thereto, depending upon the length of said slot 20. Moreover, said arm 23, in any such angular position thereof, may, by virtue of the rotatability of the socket member 19 relative to the shank 10, be swung about the axis of the handle A through an angle of 360°. Furthermore, said arm 23, in any position thereof relative to the handle A, may be rotated about its own axis. Thus it is apparent that the arm 23 and, consequently, the blade 22, may be adjusted to practically any desired operative position relative to the handle A about a center represented by the center of the spherical or ball head 24. It is equally apparent that, by a mere slight turning of the rod 27, the socket member 19 may be fastened to the shank 10 and the head 24 may be fastened within said socket member to secure said arm 23 and the blade 22 carried thereby in their desired adjusted position relative to the handle A.

In the foregoing connection and in order to insure firm, tight clamping of the head 24 in the socket member 19, the interior, outer end portion of said socket member may have a slightly greater radius than said head, thereby to provide a clearance space 32 between the outer end portion of said socket member and said head and to confine contact between said head and said socket member to a relatively narrow band 33 which tapers toward the outer end of said socket member and with which said head has wedging engagement. Accordingly, only relatively slight pressure exerted outwardly upon the head 24 is effective to frictionally lock the same securely within the socket member 19 and thereby lock the blade unit B in any adjusted position thereof. Similarly, the wedging engagement between the ribs 17 and the walls defining the sides of the channel 21 is effective, by only slight force exerted outwardly upon the arms 16, to frictionally lock the socket member 19 securely against rotation relative to the shank 10. Therefore, only slight tightening turning effort is required to be exerted upon the rod 27 to practically rigidly lock the blade unit B to the handle A in any adjusted position of said blade unit relative to said handle.

By first unscrewing the rod 27 to release the wedge member 26 sufficiently to enable the clutch arms 16 to be flexed inwardly to disengage their ribs 17 from the channel 21, the socket member 19 may readily be removed from the shank 10 and all parts of the instrument may readily be disassembled for sterilization or other purposes. Conversely, reassembly may readily be effected simply by reversing this procedure.

Referring now to the alternative form of the invention illustrated in Figs. 6 to 8, it will be observed that the socket member 19' is of the same construction as the socket member 19, except that the channel 21' thereof, instead of being of wedge shape in cross section, as in the case of the channel 21 of the socket member 19, is of forwardly opening, rearwardly tapering form at its rear end, as indicated at 34. In other words, the side wall of said socket member 19' is undercut by the rear end portion of the channel 21' so that at its rear end said channel 21' is of forwardly opening, rearwardly tapering or wedge shape in cross section.

Referring further to the Figs. 6 to 8 form of the invention, it will be observed that the ribs 17' of the clutch arms 16', instead of being of wedge shape in cross section, as in the case of the ribs 17 of the Figs. 1 to 5 construction, are undercut at their rear ends so that, in cross section, their rear end portions are of wedge shape complementing the wedge shape of the rear end of the channel 21' in which they are disposed. It thus is apparent that by outward longitudinal movement of the socket member 19' relative to the shank 10', the tapered rear end portions of the ribs 17 will become wedged in the rear end portion of the channel 21' and thereby will frictionally lock said socket member to said shank against rotation or any other movement with respect thereto.

Further in accordance with the Figs. 6 to 8 form of the invention, it will be observed that the rod 27' is threaded in the shank 10' and has its outer end engaged with the spherical or ball head 24' of the blade unit B'. Accordingly, by rotating said rod 27' to screw it outwardly relatively to the shank 10', the head 24' will be clamped in the outer end portion of the socket member 19' and the rear end portions of the ribs 17' will be urged rearwardly into the rear end portion 34 of the channel 21' to frictionally and firmly secure said socket member 19' to the shank 10'. On the other hand, by loosening the rod 27', the blade unit B' may be adjusted to any desired angular position relative to the socket member 19' and the latter may be rotated to any desired position relative to the shank 10', whereafter the adjustments may be maintained simply by tightening the rod 27'.

The Figs. 6 to 8 form of the invention has the obvious advantage that it is composed of fewer parts than the Figs. 1 to 5 form of the invention and does not include any small parts which might easily become lost when the instrument is disassembled.

While the blade 22 might be an integral part of the arm 23, it is preferred to have said blade removably, replaceably engaged with said arm, particularly as it is common and approved practice in the scalpel art to employ handles having the equivalents of the arm 23 upon which to removably, replaceably mount separate blades.

The arm 23, as in the case of the equivalent arms of known scalpel handles, is grooved at opposite sides, as indicated at 35, in accordance to known practice to accommodate portions 36 of a blade to either side of a slot 37 formed therein, the blade being engageable with and disengageable from said arm by longitudinal sliding movement relative thereto in accordance with known practice. In this connection it has not, however, been usual heretofore to joint the grooves 35 at the outer end of the arm 23 by a transverse groove, as indicated in the present instance at 38, to accommodate the portion of the blade at the outer end of the slot 37 therein. As a consequence, prior blade supporting arms have not effectively supported the blades at the outer ends of the slots 37 therein where they are weak, and as a result it has been common experience for the blades to break in the region of the outer ends of the slots 37 therein as a result of subjecting the blades to lateral or bending forces. As distinguished from this, by grooving the outer end of the arm 23 as indicated at 38 to accommodate the portion of the blade at the outer end of the slot 37 therein where it is relatively weak, it is well supported at this point against the possibility of breakage.

From the foregoing description considered in connection with the accompanying drawings, it is believed that the features of construction, combination and arrangement of parts comprising the invention will be clearly understood. It is desired to point out, however, that said features are capable of modification in various different respects and that the invention is not limited to scalpels, but may be embodied in various other implements and tools, within its spirit and scope as defined in the appended claims. For example, instead of the unit B being a blade unit, it may be any other form of work-performing or work-engaging unit such as a screw-driver bit or the nut-engaging element of a wrench or the like. Moreover, it is apparent that in a construction as illustrated in Figs. 1 to 5, the clamping element 25 may be eliminated and the outer end of the rod 27 may directly contact the head 24.

I claim:

1. An implement or tool comprising a handle, a socket member swiveled upon the outer end portion of said handle for rotative adjustments relative thereto, a work-performing unit extending from said socket member and mounted for rotative adjustments therewith relative to said handle and for swinging adjustments relative thereto in a plane including the longitudinal axis of said handle, and means for locking said socket member securely with respect to said handle and said unit securely with respect to said socket member in any position of adjustment of said socket member relative to said handle and any position of adjustment of said unit relative to said socket member.

2. An implement or tool comprising a handle, a socket member mounted upon the outer end portion of said handle coaxially therewith for rotative adjustments about its axis relative thereto, said socket member having in its outer end portion a radial slot, a work-performing unit including a head disposed in the outer end portion of said socket member and a portion extending from said head through said slot whereby said unit is swingably adjustable relative to said socket member to positions in planes intersecting the common axis of said socket member and said handle and is rotatably adjustable with said socket member relative to said handle, and means including a single finger-operable screw member effective to clamp said socket member securely to said handle in any rotative position of adjustment thereof relative to said handle and also to clamp said unit securely to said socket member in any position of adjustment of said unit relative to said socket member.

3. An implement or tool comprising a handle including an outer end portion composed of a plurality of radially flexible clutch arms having exterior transversely extending ribs of outwardly tapering cross section, a socket member having its inner end portion engaged over said arms and provided with an internal annular groove of outwardly tapering cross section accommodating said ribs, the outer end portion of said socket member having a radial slot therein, a work-performing unit including a head disposed in the outer end portion of said socket member and an arm extending from said head through said slot whereby it is adjustable to angular positions relative to the axis of said socket member, said clutch arms having internal inwardly converging surfaces, a wedge element engaged with said surfaces and operable by inward movement thereof relative to said handle to spread said clutch arms apart to urge said ribs into said channel and thereby frictionally secure said socket member to said handle in any rotatively adjusted position thereof relative to said handle, and a rod threaded through said wedge element and operatively engaged with said head whereby it is effective when screwed outwardly through said wedge element to react from said head to urge said wedge element inwardly to secure said socket member firmly to said handle and to react from said wedge element to urge said head outwardly and thus frictionally clamp the latter in said socket member.

4. An implement or tool comprising a handle including an outer end portion composed of a plurality of radially flexible clutch arms having exterior transversely extending ribs of outwardly tapering cross section, a socket member having its inner end portion engaged over said arms and provided with an internal annular groove of outwardly tapering cross section accommodating said ribs, the outer end portion of said socket member being of substantially hemispherical form and having therein a radial slot, a work-performing unit including a spherical or ball head disposed in the outer end portion of said socket member and an arm extending therefrom through said slot whereby it is rotatably adjustable about its own axis and is swingably adjustable relative to said socket member to angular positions relative to the axis of said socket member, said clutch arms having internal inwardly converging surfaces, a wedge element engaged with said surfaces and operable by inward movement thereof relative to said handle to spread said clutch arms apart to urge said ribs into said groove and thereby frictionally secure said socket member to said handle in any rotatively adjusted position thereof relative to said handle, and a rod threaded through said wedge element and operatively engaged with said head whereby it is effective when screwed outwardly through said wedge element to react from said head to urge said wedge element inwardly to secure said socket member firmly to said handle and to react from said wedge element to urge said head outwardly and thus frictionally clamp the latter in said socket member.

5. An implement or tool comprising a handle, a slotted socket member coaxial with and rotatably mounted upon the outer end portion of said handle, a work-performing unit including a head disposed in the outer end portion of said socket member and an arm extending from said head through the slot in said socket member whereby said unit is adjustable relative to said socket member, a rod threaded in said handle and operatively engaged at its outer end with said head for forcing the latter outwardly relative to said socket member and thereby clamping the same against movement relative thereto and for simultaneously urging said socket member forwardly relative to said handle, and wedge means operable in response to forward urging of said socket member relative to said handle to frictionally clamp said socket member against rotation relative to said handle.

6. An implement or tool comprising a handle including an outer end portion composed of a plurality of radially flexible arms having exterior ribs provided at their inner ends with rearwardly and outwardly inclined faces, a socket member having its inner end portion engaged over said arms and provided with forwardly and inwardly inclined faces with which the rear faces of said ribs are engaged, said socket member being rotatably adjustable relative to said handle and having a slot in its outer end portion, a work-performing unit including a head disposed in the outer end portion of said socket member and an arm extending from said head through said slot, and a rod threaded in said handle and operatively engaged at its outer end with said head to urge the latter forwardly in said socket member and to urge said socket member forwardly relative to said handle, thus to clamp said head in said socket to maintain adjustment of said unit relative thereto and to cause said inclined faces to coact to clamp said socket member to said handle against rotation relative thereto.

7. An implement or tool comprising a handle, a slotted socket member coaxial with and rotatably mounted upon the outer end portion of said handle, a work-performing unit including a head disposed in the outer end portion of said socket member and an arm extending from said head through the slot in said socket member whereby said unit is adjustable relative to said socket member, a rod threaded in said handle and operatively engaged at its outer end with said head for forcing the latter outwardly relative to said socket member and thereby clamping the same against movement relative thereto, and means operable by head-clamping manipulation of said rod to clamp said socket member against rotation relative to said handle in any position of rotative adjustment of the same relative to said handle.

8. An implement or tool comprising a handle, a slotted socket member coaxial with and rotatably mounted upon the outer end portion of said handle, a work-performing unit including a head disposed in the outer end portion of said socket member and an arm extending from said head through the slot in said socket member whereby said unit is adjustable relative to said socket member, a rod threaded in said handle and operatively engaged at its outer end with said head for forcing the latter outwardly relative to said socket member and thereby clamping the same against movement relative thereto, and wedge means operable by head-clamping manipulation of said rod to clamp said socket member against rotation relative to said handle in any position of adjustment of the same relative to said handle.

THOMAS R. ARDEN.

REFERENCES CITED

The following references are of record in the file of this patent:

UNITED STATES PATENTS

| Number | Name | Date |
| --- | --- | --- |
| 2,215,125 | Maltz | Sept. 17, 1940 |
| 2,257,141 | Waugh | Sept. 30, 1941 |
| 1,124,073 | Sullivan | Jan. 5, 1915 |
| 1,671,991 | Lindner | June 5, 1928 |
| 1,779,057 | Tolmach | Oct. 21, 1930 |
| 649,234 | Chiavaro | May 8, 1900 |
| 1,202,698 | Ford | Oct. 24, 1916 |
| 64,654 | Floyd | May 14, 1867 |
| 2,119,579 | Hagman et al. | June 7, 1938 |